(12) United States Patent
Swann et al.

(10) Patent No.: US 11,260,983 B2
(45) Date of Patent: Mar. 1, 2022

(54) AIRCRAFT ELECTRICALLY-ASSISTED PROPULSION CONTROL SYSTEM

(71) Applicant: Rolls-Royce plc, London (GB)

(72) Inventors: Peter Swann, Nottingham (GB); Paul Fletcher, Rugby (GB); Alvise Pellegrini, Kempston (GB); Ashog Kulathasan, Berlin (DE)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 16/552,433

(22) Filed: Aug. 27, 2019

(65) Prior Publication Data
US 2020/0010205 A1 Jan. 9, 2020

Related U.S. Application Data

(63) Continuation of application No. 15/846,994, filed on Dec. 19, 2017, now Pat. No. 10,435,165.

(30) Foreign Application Priority Data

Dec. 22, 2016 (GB) ...................... 1622012

(51) Int. Cl.
*B64D 27/24* (2006.01)
*B64D 31/06* (2006.01)
(Continued)

(52) U.S. Cl.
CPC ............. *B64D 27/24* (2013.01); *B64D 31/06* (2013.01); *F02C 9/48* (2013.01); *F02C 9/54* (2013.01);
(Continued)

(58) Field of Classification Search
CPC .. B64D 27/24; B64D 31/06; B64D 2027/026; B64D 2041/002; F02C 9/48;
(Continued)

(56) References Cited

U.S. PATENT DOCUMENTS

| | | |
|---|---|---|
| 3,289,409 A | 12/1966 | Schirmer |
| 4,557,106 A | 12/1985 | Ffowcs Williams et al. |

(Continued)

FOREIGN PATENT DOCUMENTS

| | | |
|---|---|---|
| GB | 2537743 A | 10/2016 |
| WO | WO 2016/020618 A1 | 2/2016 |

OTHER PUBLICATIONS

Great Britain Search Report, issued in Great Britain Application No. 1622012.1, dated Jun. 20, 2017, pp. 1-2, GB Intellectual Property Office, Newport, UK.

(Continued)

*Primary Examiner* — Hoang M Nguyen (74) *Attorney, Agent, or Firm* — Crowell & Moring LLP (57) ABSTRACT

This invention concerns an aircraft propulsion system in which an engine has an engine core comprising a compressor, a combustor and a turbine driven by a flow of combustion products of the combustor. At least one propulsive fan generates a mass flow of air to propel the aircraft. An electrical energy store is provided on board the aircraft. At least one electric motor is arranged to drive the propulsive fan and the engine core compressor. A controller controls the at least one electric motor to mitigate the creation of a contrail caused by the engine combustion products by altering the ratio of the mass flow of air by the propulsive fan to the flow of combustion products of the combustor. The at least one electric motor is controlled so as to selectively drive both the propulsive fan and engine core compressor.

15 Claims, 6 Drawing Sheets

(51) Int. Cl.
   *F02C 9/48*    (2006.01)
   *F02C 9/54*    (2006.01)
   *F02K 5/00*    (2006.01)
   *B64D 27/02*   (2006.01)
   *B64D 41/00*   (2006.01)

(52) U.S. Cl.
   CPC .......... *F02K 5/00* (2013.01); *B64D 2027/026* (2013.01); *B64D 2041/002* (2013.01); *F05D 2220/50* (2013.01); *F05D 2220/76* (2013.01); *F05D 2270/08* (2013.01); *F05D 2270/081* (2013.01); *F05D 2270/311* (2013.01); *F05D 2270/312* (2013.01); *F05D 2270/313* (2013.01); *Y02T 50/60* (2013.01)

(58) Field of Classification Search
   CPC ......... F05D 2270/311; F05D 2270/313; F05D 2270/312; F05D 2220/50; F05D 2270/08
   USPC .......................................... 60/772; 244/1 TD
   See application file for complete search history.

(56) References Cited

U.S. PATENT DOCUMENTS

| | | | |
|---|---|---|---|
| 9,739,207 | B2 | 8/2017 | Hillel et al. |
| 10,435,165 | B2 * | 10/2019 | Swann ................... B64D 27/24 |
| 2006/0254255 | A1 * | 11/2006 | Okai ...................... B64D 27/24 |
| | | | 60/226.1 |
| 2010/0043443 | A1 | 2/2010 | Noppel et al. |
| 2010/0083632 | A1 | 4/2010 | Foster et al. |
| 2010/0126178 | A1 * | 5/2010 | Hyde .................... B64D 27/24 |
| | | | 60/767 |
| 2010/0132330 | A1 | 6/2010 | Noppel et al. |
| 2010/0219779 | A1 | 9/2010 | Bradbrook |
| 2015/0013306 | A1 | 1/2015 | Shelley |
| 2015/0144742 | A1 * | 5/2015 | Moxon .................. B64D 27/12 |
| | | | 244/215 |
| 2016/0214727 | A1 * | 7/2016 | Hamel ................... B64D 27/20 |
| 2016/0304211 | A1 | 10/2016 | Swann |
| 2016/0325629 | A1 * | 11/2016 | Siegel ................... B64D 35/02 |
| 2016/0355272 | A1 * | 12/2016 | Moxon .................. B64D 35/04 |
| 2017/0226934 | A1 | 8/2017 | Robic et al. |
| 2018/0354632 | A1 * | 12/2018 | Hon ....................... B64D 27/24 |

OTHER PUBLICATIONS

Combined Search and Examination Report under Sections 17 and 18(3), issued in Great Britain Patent Application No. GB1914192.8, dated Nov. 14, 2019, pp. 1-8, Great Britain Intellectual Property Office, South Wales, UK.

* cited by examiner

AIRCRAFT ELECTRICALLY-ASSISTED PROPULSION CONTROL SYSTEM

CROSS-REFERENCE TO RELATED APPLICATION

This application is a continuation of U.S. non-provisional application Ser. No. 15/846,994 filed Dec. 22, 2016, which claims priority to UK Patent Application Number 1622012.1 filed on Dec. 22, 2016. The entire contents of each of the above-identified applications are hereby incorporated by reference.

BACKGROUND OF THE INVENTION

1. Field of the Disclosure

The present disclosure concerns aircraft propulsion systems in which electrical energy is used to supplement the operation of a combustion engine. The invention particularly concerns methods for aiding in the control of the negative climate impact resulting from operation of a combustion engine, for example via vapour trail formation.

2. Description of the Related Art

Vapour trails, also known as condensation trails or contrails, are line-shaped ice clouds that appear behind aircraft under certain circumstances. The formation of a contrail depends on a number of factors, including: ambient temperature, humidity and pressure; the efficiency of the aircraft's engines; and the properties of the fuel burned in the engines.

During the day, contrails reflect a proportion of incoming sunlight away, leading to a climate cooling effect which is at least partially offset against the climate warming impact associated with the absorption by contrails of heat radiating upward from the planet's surface. During the night, however, the cooling effect is not operative. For this reason, a contrail's climate warming impact (per unit time of contrail existence) is typically greater during the night than during the day. It is estimated that, globally, night-time flying accounts for some 40% of total flying miles, but for some 60% of aviation's total contrail-related climate warming impact.

The climate warming impact of a contrail is also influenced by its temperature such that a contrail forming in colder air will exert more of a climate warming effect than an otherwise equivalent contrail which forms in slightly warmer air. A contrail, once formed, will typically dissipate within a minute or so, unless the ambient air is supersaturated with respect to ice, in which case the contrail may persist. A persistent contrail may grow over time to resemble natural cirrus cloud, both in size and optical properties, and is then referred to as "contrail-cirrus". Line-shaped contrails and contrail-cirrus are collectively referred to as "aviation-induced cloudiness" (AIC). Contrail-cirrus is thought to cause a majority of the negative climate impact of AIC due to it being spatially larger and longer-lived relative to a non-persistent line-shaped contrail.

Depending on the metric employed, the climate-warming impact of aviation induced cloudiness may be of a similar magnitude to that of the carbon dioxide ($CO_2$) emitted by aircraft, and may therefore represent a significant element of aviation's total climate impact. The partial or complete suppression of contrail formation, and particularly the partial or complete suppression of persistent contrails, may represent an opportunity for a significant reduction in the overall climate warming impact of aviation. Here we use the term "partial suppression of contrails" to mean a reduction in the optical depth of formed contrails.

However, a number of potential techniques for reduction of contrail formation or modification of contrail properties by a gas turbine engine require the use of bespoke equipment and/or materials that are additional to those required for conventional engine operation. Any weight and/or energy penalties incurred in order to achieve contrail suppression or modification of contrail properties require careful scrutiny to determine whether such penalties outweigh the possible contrail reduction benefits on climate impact.

Conventional propulsion systems for civil aircraft typically comprise one or more turbofan engine placed under the wings of the aircraft. However, some studies have indicated that so-called distributed propulsion, which involves having numerous smaller propulsion units preferentially arranged around an aircraft, may provide some significant benefits in terms of noise reduction and fuel efficiency when compared with current state of the art propulsive arrangements.

The distributed propulsion units are typically electrically driven with the electrical energy being supplied from a power source mounted onto the airframe. The power source may be a battery but this is usually supplemented by an on-board generator powered using a reciprocating engine or, more usually, a gas turbine. It has been recognised that this arrangement can have a greater propensity for contrail formation than a conventional turbofan engine since the exhaust from the reciprocating or gas turbine engine has a relatively high water-vapour partial pressure relative to the temperature of the exhaust i.e. the "contrail factor", which is used herein to refer to the gradient of a line representing the mixing of engine exhaust air with ambient air, when plotted on a chart using water-vapour partial pressure as the y-axis and temperature as the x-axis, is relatively high. A reduction in an engine's contrail factor reduces the range of ambient conditions under which the engine can form a contrail. Alternatively, at a particular ambient condition (characterised by pressure, temperature and humidity), a reduction in contrail factor may allow a transition from formation of a contrail to non-formation of a contrail.

It is an object of the invention to manage the formation of contrails by aircraft engines in a manner that reduces negative impact on the climate. It may be considered an additional or alternative object to provide a practical system for implementation of contrail control for an aircraft.

BRIEF SUMMARY OF THE INVENTION

According to a first aspect of the invention there is provided an aircraft propulsion system comprising: an engine having an engine core comprising a compressor, a combustor and a turbine driven by a flow of combustion products of the combustor; at least one propulsive fan for generating a mass flow of air to propel the aircraft; an electrical energy store on board the aircraft; at least one electric motor arranged to drive the propulsive fan and the engine core compressor; and a controller arranged for control of the at least one electric motor to mitigate the creation of a contrail caused by the combustion products by altering the ratio of the mass flow of air by the propulsive fan to the flow of combustion products of the combustor, wherein control of the at least one electric motor comprises selectively driving both the propulsive fan and engine core compressor.

The controller may monitor conditions indicative of contrail formation. The controller may monitor conditions indicative of the formation of contrails having a negative climate impact.

The controller may reduce the flow of combustion products produced by the engine core to mitigate or suppress the creation of a contrail.

The controller may increase the power/torque supplied to the propulsive fan by the electric motor during contrail mitigation. The controller may increase/control the rotational velocity of the propulsive fan via the electric motor during contrail mitigation.

The controller may control operation of the electric motor so as to meet a thrust demand for the aircraft. Where the flow rate of combustion products is reduced by lowering the rate of fuel burn in the engine core this may reduce torque and/or thrust generated by the engine core. The reduced torque and/or thrust may be mitigated by increasing the torque applied to one or more propulsive fan by the electric motor.

The at least one electric motor may selectively assist the engine core compressor, e.g. supplementing the torque applied to the compressor due to the engine core combustion process.

The controller may control the operation of the at least one electric motor according to one or more operational variable for the engine core, e.g. the engine core compressor.

The controller may monitor operation of the engine core compressor. The controller may monitor an absolute or relative operational variable for the engine core compressor, such as any or any combination of rotational speed, torque, flow rate and/or pressure rise. Additionally or alternatively, the controller may monitor temperature and/or fuel flow rate for the combustor.

The controller may monitor the relative operation between the propulsive fan and the engine core compressor, e.g. according to relative values of the operational variable.

The controller may operate the electric motor to selectively drive the engine core compressor according to one or more predetermined threshold value of the operational variable. The threshold may comprise a safety threshold, such as a compressor surge margin.

The at least one electric motor may be controlled according to a control hierarchy wherein priority is given to driving the one or more propulsive fan or the engine core compressor for contrail mitigation, e.g. provided the threshold is not met or exceeded.

The at least one electric motor may comprise a first electric motor arranged to drive the propulsive fan and a second electric motor arranged to drive the engine core compressor. The engine core compressor may be assisted by the second electric motor selectively, e.g. only during operation of the first electric motor or only during a portion of the operational range of the first electric motor. Alternatively, a single electric motor may be provided, with a suitable selective transmission arrangement for driving either or both of the propulsive fan and engine core compressor.

The propulsive fan may be driven at least in part by a low pressure turbine, e.g. via a low pressure shaft. The propulsive fan may be coaxial with the engine core.

A gearing may be provided for altering the speed of the propulsive fan relative to the speed of an intermediate pressure turbine. The system may comprise a geared turbofan engine.

The engine may comprise an intermediate compressor (IPC), e.g. having one or more row of compressor blades, for compressing air to the engine core compressor. The propulsive fan may be drivingly connected to the IPC via a gearing.

A gearing may be provided between the at least one electric motor and the propulsive fan and/or engine core compressor.

A propulsive fan rotor may have one or more row of low pressure compressor blades for compressing air to the engine core compressor. The propulsive fan may comprise a booster. The compressor/booster may rotate in unison, e.g. at a corresponding rotational speed, with the propulsive fan.

The engine may comprise a two-shaft gas turbine engine. The engine may comprise a boosted turbofan engine.

The system may comprise one or more ambient condition sensor, e.g. for sensing any or any combination of ambient temperature, pressure and/or moisture/ice content.

The system may comprise one or more electrical generator for charging the electrical energy store. The generator may be driven by the engine. The first and/or second motor may operate as a generator, e.g. when not being used to drive the respective propulsive fan or engine core compressor. Accordingly, the term 'electric motor' as used herein may be considered to be a reference to an electric machine, including generator functionality, where applicable.

There may be one or more further propulsive units which are distributed around the fuselage and/or wings of the aircraft. The further propulsive units may be electrically driven fans connected to the electrical energy store via an electrical network, wherein upon sensing conditions indicative of contrail formation power supply to the further propulsive units from the electrical energy store may be initiated or adjusted, e.g. as either a power increase or decrease.

According to a second aspect of the invention, there is provided a method of operating an aircraft propulsion system having an engine with an engine core comprising a compressor, a combustor and a turbine; at least one propulsive fan for generating a mass flow of air to propel the aircraft; and an electrical energy store on board the aircraft, the method comprising: supplying fuel to the engine core combustor to produce a flow of combustion products for driving the engine core turbine and compressor; monitoring conditions indicative of contrail formation; selectively altering the ratio of the mass flow of air by the propulsive fan to the flow of combustion products of the combustor; and selectively assisting rotation of the engine core compressor by an electric motor drawing energy from the electrical energy store during the altering of said ratio.

The altering of said ratio may comprise reducing the rate of fuel consumption of the engine core and/or the rate of thrust/combustion products produced by the engine core. The rotation of the compressor may be assisted when the rate of combustion and/or rotational speed of the compressor reduce.

According to a third aspect of the invention, there is provided a data carrier comprising machine-readable instructions for the operation of an aircraft propulsion controller to: receive sensor readings for a plurality of engine operation variables; monitor conditions pertaining to adverse contrail formation by combustion products from the engine; output control instructions in response to a determination of adverse contrail formation to alter a ratio of the mass flow of air by a propulsive fan to a flow of combustion products of an engine core combustor; and concurrently output control instructions to selectively assist rotation of a compressor for the engine core by an electric motor drawing energy from an electrical energy store.

Any of the preferable features defined in relation to any one aspect of the invention may be applied to any further aspect. Accordingly the invention may comprise various alternative configurations and combinations of the features defined above.

BRIEF DESCRIPTION OF THE DRAWINGS

Practicable embodiments of the invention are described in further detail below by way of example only with reference to the accompanying drawings, of which.

DETAILED DESCRIPTION OF THE DISCLOSURE

Figure 1:
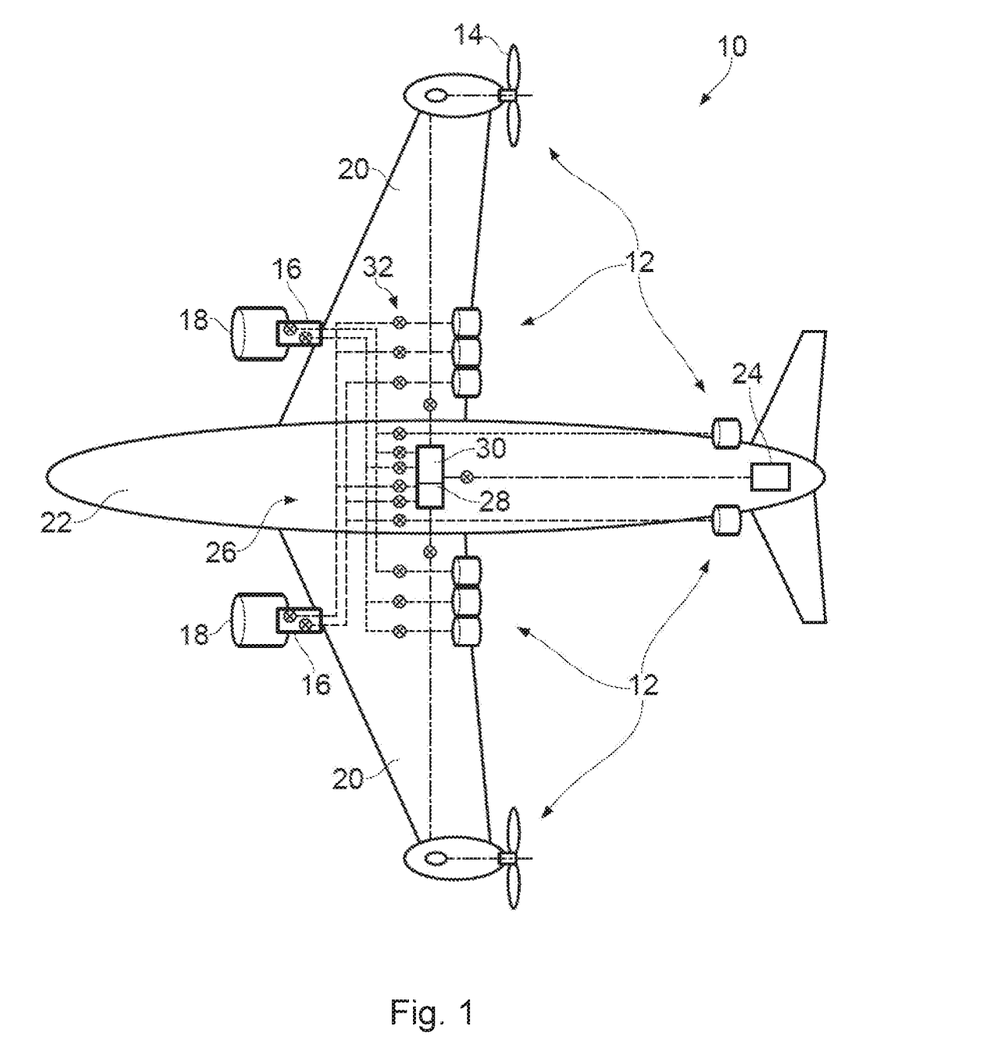
FIG. 1 shows an overview of an aircraft having a distributed propulsion system.

In FIG. 1 there is shown a schematic representation of an aircraft having an electrically assisted propulsive system 10 according to an example of the present invention. Although the rest of the description is mostly directed to aircraft having distributed propulsion units it will be appreciated that distributed propulsion systems provide just one context in which the invention may be used and aircraft without distributed propulsion may also operate in accordance with aspects of the invention described herein.

The electrical propulsive system 10 includes a plurality of electrical propulsive units in the form of fans 12 which are rotatably driven by electrical machines, for example superconducting electrical machines.

Each of the fans 12 includes a rotor having fan blades 14 mounted on a rotatable hub and may have a blade pitch adjustment mechanism for synchronously adjusting the pitch of the blades 14 relative to the air flow which passes them in use. Although only the propulsive units on the wings are shown as having blades 14, it will be appreciated that all of the propulsive units 12 include fans and blade arrangements. The electrical propulsive units 12 are placed in various locations around the fuselage 22 and wings 20 of the aircraft, e.g. so as to ingest boundary layer air, which is energised and exhausted to provide propulsive thrust. Having a plurality of smaller propulsive units 12 rather than two (or more) large gas turbine engines helps reduce drag and allows for a more efficient bypass ratio of the propulsive system, thereby increasing efficiency of the aircraft.

In the embodiment shown, there are six electrical propulsive units 12 located towards the trailing edge of the wing and two located towards a rear portion of the fuselage flanks. Two further units are located on the tips of the wings. All of the propulsive units 12 may be of the ducted variety or open rotor propellers as are known in the art.

The electrical machines which drive the propulsive units 12 may be superconducting synchronous machines having superconducting rotors which are permanently magnetised in use. The rotors are driven using stator windings which may or may not be superconducting. Such machines are known in the art. As will be appreciated, the electrical machines may be operated as motors or generators. The term 'electrical machine' as used herein is also intended to encompass a plurality of electrical machines acting together to rotably drive (or be rotably driven in unison by) a single rotor or rotor assembly, such as the propulsive fan of an engine. While a single electrical machine would typically be understood to drive a rotor/assembly near its hub or via a shaft, a plurality of electrical machines could be arranged circumferentially around the rotor/assembly, and drive it from the circumference, for example via a ring.

The electrical propulsion system 10 also includes a plurality of electrical sources in the form of electrical generators 16, e.g. synchronous machines, which are driven by power plants, such as the shown two main gas turbine engines 18 located underneath the wings 20. The gas turbine engines 18 operate in a conventional manner but are configured for operation as part of a distributed propulsion system 10. In some examples, the engines 18 may have a reduced bypass ratio so as to reduce aero-dynamic drag, or the bypass duct is removed completely to further reduce the aero-dynamic drag.

The electrical generators 16 and the electrical machines of the propulsive units 12 are electrically connected via cables in the form of a bus system 26 and as such collectively form an electrical network. The electrical network may also include ancillary equipment in the form of isolators and fault current limiters which are generally indicated by reference numeral 32. The electrical generators 16, bus system 26 and fault current limiters 32 within the network may or may not be superconducting.

The propulsive system 10 includes an electrical energy store 30 and a control system which has at least one controller 28 which is configured, at least in part, to monitor and determine the required thrust for each propulsive unit. In some embodiments, the controller 28 may regulate the pitch of the fan blades to control the amount of propulsive force produced and to optimise the aerodynamic efficiency of the fan blades over a wide range of combinations of aircraft forward speed and fan rotational velocity.

In the embodiment shown, an auxiliary power unit 24 is provided, e.g. at the rear of the fuselage. The auxiliary power unit may for example be a gas turbine, a reciprocating engine or a fuel cell. The auxiliary power unit is arranged to provide electrical power to the aircraft when the main generators 16 are inoperable, for example, prior to the engines 18 being started. The auxiliary power unit may be replaced or supplemented by an electrical storage device e.g. one or more battery units.

The separation of the power plant from the propulsive units means that the engine 18 is susceptible to contrail formation in a much wider range of atmospheric conditions since the exhaust contains all the water vapour released from combustion but does not contain all the heat energy that would be present in a turbofan exhaust since, in a distributed propulsion arrangement, some or all of the fan work is exhausted elsewhere. The invention may find particular application in such a distributed propulsion system but it is not limited thereto since any gas turbine engine may be susceptible to contrail formation under certain operating and ambient conditions.

Figure 2:
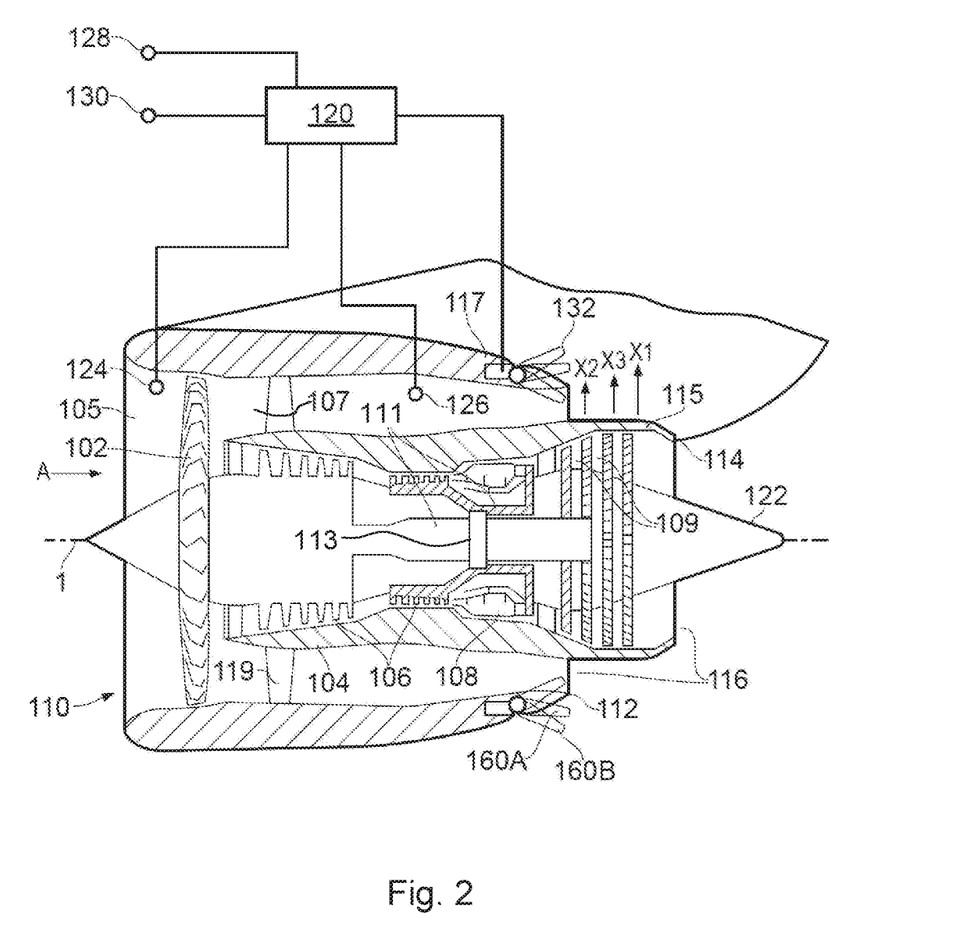
FIG. 2 shows a longitudinal section through an aircraft engine according to one example of the invention.

FIG. 2 depicts a simple schematic of an arrangement of a power plant 110 for an aircraft, such as the engine 18 in FIG. 1, or else an engine for a non-distributed aircraft propulsion system. The power plant has an engine core that drives an electrical generator and a ducted bypass past the core, the core exhaust and the bypass exhaust mixing either in a combined duct or shortly downstream of the end of one or more of the core or bypass duct. The engine core may be a reciprocating engine, or a gas turbine. For the rest of this application the embodiments will be described with respect to a gas turbine engine core.

The gas turbine engine comprises in axial flow series a series of compressors 106, a combustor 108 and a series of turbines 109. There is a general direction of airflow, indicated by arrow A, through the turbofan gas turbine engine in operation and the terms upstream and downstream are used with reference to this general flow direction.

The flow through the engine flows through the compressors where it is compressed and passed into the combustor 108 where it is mixed with fuel and the fuel is burnt in the air in the combustor. The combustion of the fuel in the compressed air in the combustor 108 produces hot gases including water vapour, which exit the combustor and flow downstream through and thereby drive the turbines. The turbines drive the compressors and an electrical generator 113 via shafts 111, which drivingly connect the turbines with the compressors and the electrical generator. The electrical generator 113 is driven in this example selectively by either or both the engine core (high pressure) turbine and the low pressure turbines 109 via respective shafts. In other examples a separate generator could be provided for each shaft as will be described in further detail below.

The exhaust gases leaving the turbines flow through the exhaust nozzle assembly to provide some propulsive thrust. At, or just after the exhaust nozzle, air passing through the bypass 107 is mixed with the core exhaust. The air that passes through the bypass duct has, at the exit of the duct, a higher temperature than the ambient air. The combined mixed exhaust flow has a significantly lower contrail factor than the engine core exhaust flow alone. By increasing the rate of heat input to the flow of air and/or the mass flow rate of air through the bypass duct relative to the rate of water vapour input into or formed within in the core, the contrail factor of the combined mixed exhaust can be further reduced.

A two-shaft, or two-spool, engine arrangement is shown in FIG. 2 in which a low pressure compressor (i.e. comprising a plurality of compressor rows/stages) feeding air to the engine core is provided on the lower pressure shaft between the fan 102 and the turbine(s) 109. Thus the low pressure compressor acts as a booster in a so-called boosted turbofan configuration.

Figure 3:
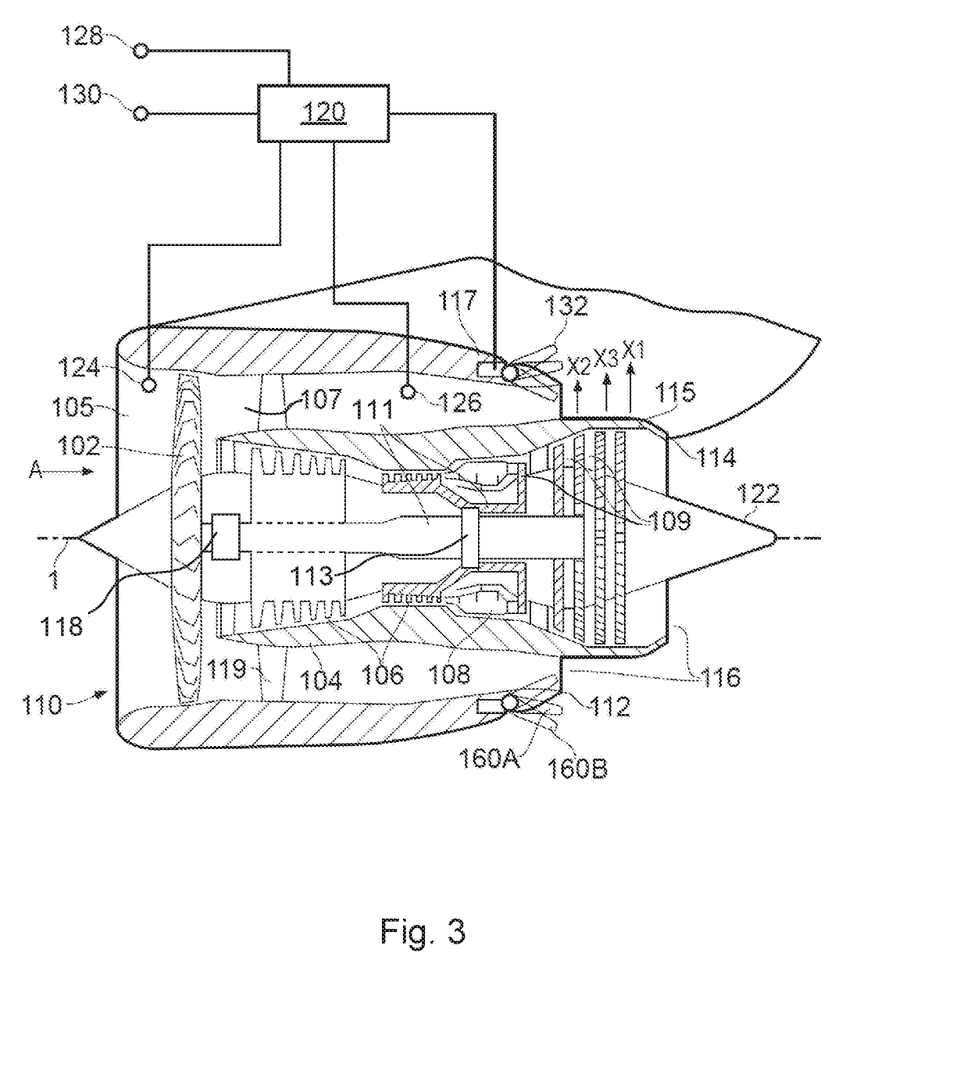
FIG. 3 shows a longitudinal section through an aircraft engine according to a further example of the invention.
Figure 4:
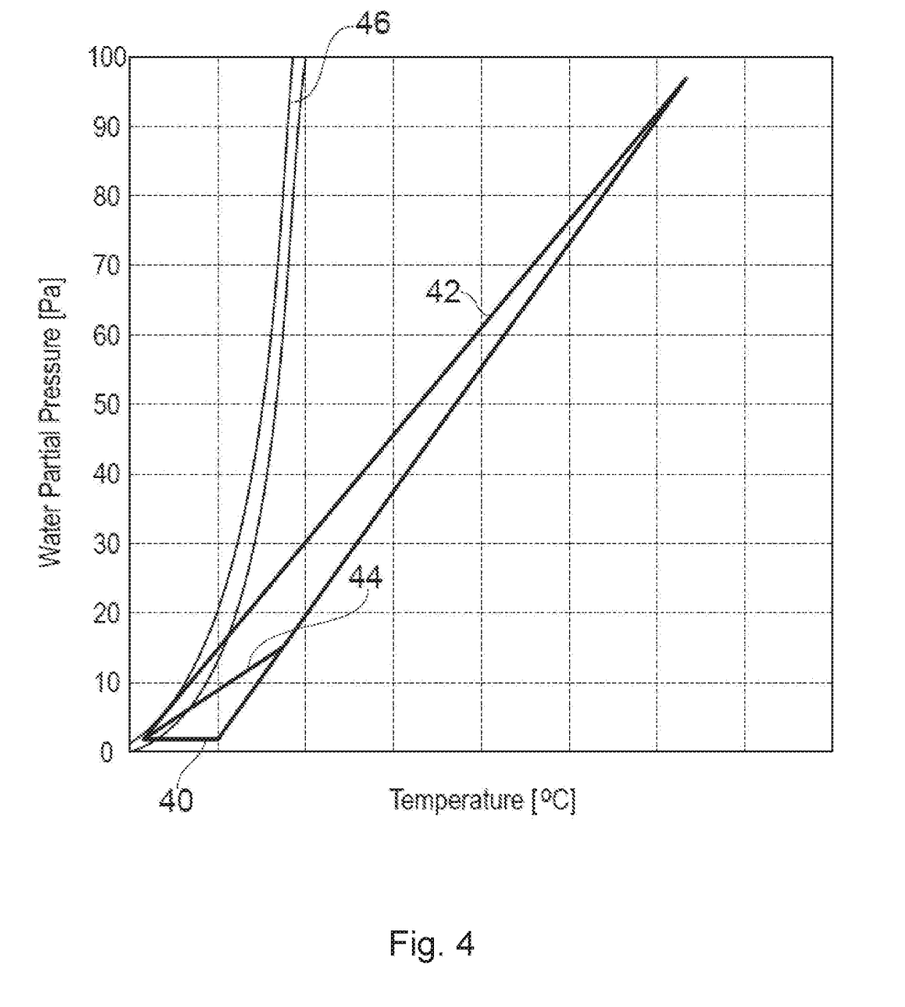
FIG. 4 is a graph depicting contrail factors for different operational regimes of the engine of FIG. 2.

FIG. 3 shows another engine example, for which corresponding numerals have been used to denote corresponding features with FIG. 2. The example of FIG. 3 differs to that of FIG. 2 in that a gearing arrangement 118 (e.g. a reduction gearbox) is provided in the force path between the lower pressure shaft of the shafts 111 and the fan 102. This is to allow the fan 102 to rotate at a more optimal speed relative to that of the corresponding turbine and/or intermediate pressure compressor (IPC). It will be appreciated that, in such a geared turbofan configuration, the compressor 106 associated with the radially inner shaft 111 is typically referred to as the IPC, rather than the low pressure compressor of FIG. 2. The gearbox 118 may be provided between the IPC and the fan 102 such that the fan is driven via the gearbox by the corresponding intermediate pressure shaft. FIG. 4 is an exemplary graph showing the mixing line of a fan exhaust 40, a core exhaust 42 and an exhaust 44 comprising the combination of the core exhaust and the fan exhaust. Each of the mixing lines 40, 42, 44 is characterised by a gradient, sometimes known as the "contrail factor", which is the ratio between the added water vapour to added heat in the exhaust relative to ambient conditions. The lower left end of each line 40, 42, 44 represents ambient conditions. Each mixing line shows the evolution of temperature and water vapour partial pressure from exhaust conditions to ambient conditions. Also shown is the water saturation curve 46 of air at a given temperature. If any part of a mixing line lies on or to the left of the water saturation curve there is a likelihood that contrails will form or may form. If a mixing line lies entirely to the right of the water saturation curve there is no chance, or minimal chance, that contrails will form.

Turning first to the core exhaust, the gradient of the line 42 is relatively steep i.e. although the exhaust is hot there is also a large amount of water vapour within the exhaust. Within some regions of operation at least part of the line 42 lies to the left of the water saturation curve indicating that there is a risk of contrail formation.

The contrail factor of the fan (being the gradient of the line 40), by contrast, is close to zero. Although the fan inputs work into the flow this is achieved without any water being supplied into the flow. At no point does the line pass to the left of the water saturation curve so there is no, or minimal risk of contrail formation. The contrail factor, and hence the gradient of the mixing line 44, of the mixed exhaust is less than the contrail factor, and hence the gradient of the mixing line 42, of the core exhaust but greater than the contrail factor, and hence the gradient of the mixing line 40, of the fan exhaust. It will be appreciated that, by increasing the temperature of the fan flow, or increasing the air mass flow rate through the bypass duct 107 relative to the air mass flow rate through the engine core and, assuming that the rate of water mass flow within the mixed exhaust stays the same, or decreases, the contrail factor can be further reduced to the point at which the risk of contrail formation is negated for all but extreme situations.

A decrease in the rate of water vapour emission can be achieved by reducing the rate of fuel-flow to the combustor 108. Thus, vapour emission and/or the mixing line may be used for determining when and to what extent to control the rate of fuel-flow to the combustor 108 for contrail suppression.

As mentioned earlier, in a distributed propulsion architecture the coaxial fan 102 may not be needed to provide instantaneous propulsive thrust as this is achieved by the distributed fans. Accordingly, the coaxial fan 102 may be used selectively and it may be desirable to selectively open and close the bypass in accordance with the need for operation of the coaxial fan 102.

Figure 5:
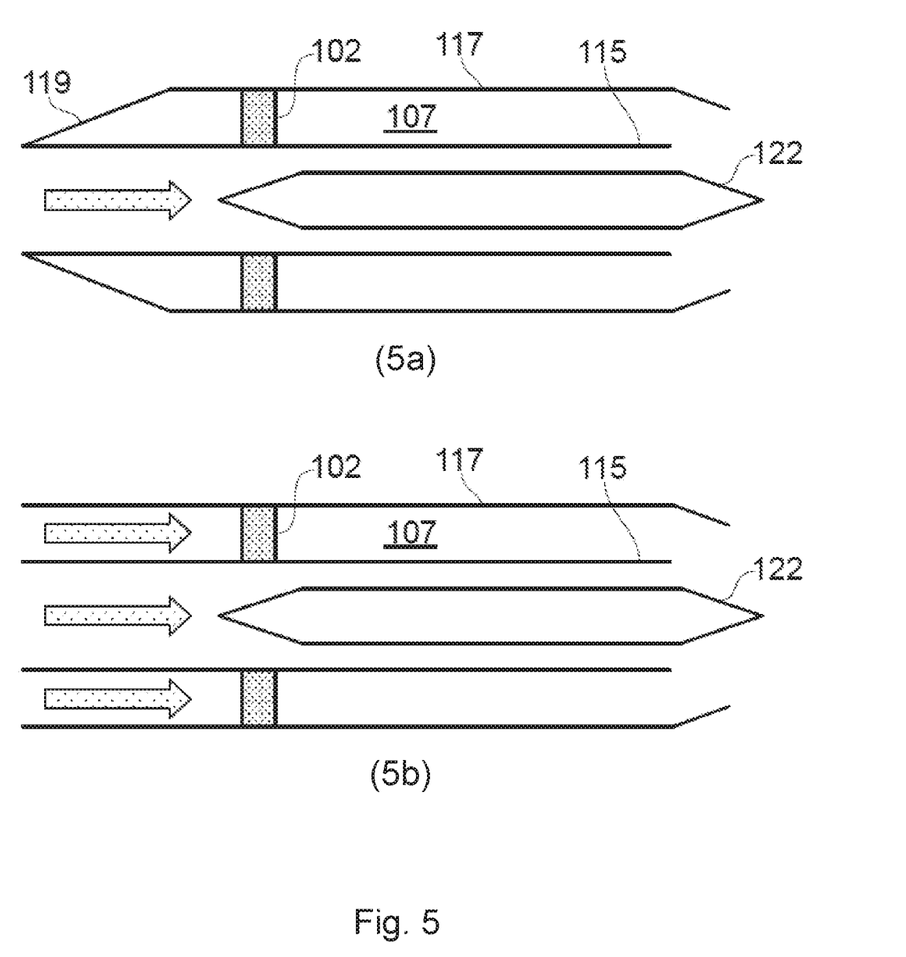
FIG. 5 is a simplified image of a gas turbine having a bypass with a modulating inlet.

At times when contrail suppression, or fan operation, is not required the airflow through the bypass may be reduced, or optionally closed off, in order to reduce drag as far as possible. FIG. 5 depicts a simplified image of a possible arrangement with FIG. 5a depicting an operational state in which the bypass is closed and FIG. 5b depicting an operational state in which the bypass is open.

The bypass closure 119 may be one or more flaps that may be moved between a position in which the bypass is closed (FIG. 5a) or substantially closed and a position in which the bypass is open (FIG. 5b). In the position in which the bypass is closed the flap preferably directs the air radially outwardly and around the engine nacelle 117 by presenting a sloped surface to the air flow. In an alternative arrangement, the flap provides a bluff surface but this will have a detrimental impact on the drag of the engine.

The flap may be hinged at a forward edge in which it lies flush against the radially inner wall 115 of the bypass when the duct is open. The flap may be hinged at a rearward edge in which the flap rotates outwardly to form an extension of the nacelle or radially outer wall 117 of the bypass duct when the duct is open.

Alternatively, the bypass may be closed by an alternative mechanism e.g. an inflatable bag that may lie against a surface of the bypass duct in an uninflated state when the bypass duct is required to be open and across the bypass in an inflated state when the duct is required to be closed. The bag may be shaped such that in an inflated configuration it presents a slope to the air flow that directs air radially outwardly and around the engine.

In examples of variable bypass closures shown in FIGS. 2 and 3, the exhaust nozzle assembly 116 comprises two concentric exhaust nozzles, a radially outer bypass, or fan, exhaust nozzle 112 and a radially inner core exhaust nozzle 114. The core exhaust nozzle 114 is defined at its radially outer extent by a generally frusto-conical core nozzle wall 115 and at its radially inner extent by a frusto-conical engine plug structure 122.

The bypass, or fan, exhaust nozzle 112 is defined at its radially outer extent by a nacelle, or fan casing, 117 and at its radially inner extent by the core nozzle wall 115. The bypass, or fan 102, exhaust nozzle 112 may be a variable area fan exhaust nozzle.

The bypass duct 107 is also defined at its radially outer extent by the nacelle, or casing, 117, which is generally annular and arranged coaxial with the engine axis 1. Thus, the nacelle, or fan casing, 117 defines a flow passage through the turbofan gas turbine engine 110. The bypass, or fan, exhaust nozzle 112 is arranged at the downstream end of the nacelle 117.

A controller 120 may be arranged to control an actuator 132 to vary the cross-sectional area of the variable area fan exhaust nozzle 112 according to sensor signals. The nozzle may adopt different positions 160A, 160B as required. Although in the above-described example, the actuator 132 has discrete positions of actuation, it will be appreciated that any flow opening which is actuable according to the invention will typically be variably actuable over the available range of actuation so as to adopt any suitable condition within that range according to the sensed operating/ambient conditions. Accordingly the actuator or flow opening may be range-taking. In one example a plurality of predetermined actuator positions and/or flow opening areas may be defined such that the controller selects one of the predetermined options in use, for example the predetermined option which is closest to an optimal position determined by the controller.

Whilst the above description and FIGS. 2, 3 and 5 describe the variable control of the bypass flow for completeness, it will be appreciated that those details concern certain implementations of the invention only, and the associated features may be excluded from other examples of the invention in which they are not required.

In an alternative embodiment a fan may be associated with the bypass duct and may be operable or operated at a different rotational velocity at times where the contrail suppression is deemed necessary and desirable. The rotational velocity of the fan may be controlled to change either or both of the heat input into the flow of air through the bypass duct or the mass flow rate of air passing through the bypass. The change in rotational velocity may feature in combination with other features such as a variable pitch rotor, variable area nozzle and/or variable outlet guide vanes 119 to help accommodate a wide range of fan pressure ratios and aircraft forward speed.

The rotational velocity of the fan may be used to capture energy during descent, acting as a turbine and driving the generator 113 which replenishes an energy store and/or provides energy to aircraft electrical systems.

The fan may be driven electrically, mechanically or as a hybrid where the fan is driven mechanically with a supplemental electrical drive, or electrically with a supplemental mechanical drive. A mechanical drive (e.g. a co-axial fan 102 with the engine core as shown in FIG. 2) with a supplemental electrical drive may be used where the fan is used for general propulsive purposes as well as for contrail suppression.

When the engine is operating in a mode that suppresses contrails the bypass air flow may be increased by increasing the fan rotational speed with a possible change in fan blade pitch and/or a possible change in fan OGV pitch and/or a change in bypass nozzle area.

In an arrangement which supplements a mechanically driven fan, or where the fan is purely electrically driven, the core fuel flow, core mass flow, and hence the water-vapour emissions in the core, can be decreased and an electrical drive to the fan used to supplement the reduced mechanical drive.

As there is a reduction in core mass-flow and water input into the core mass-flow there is an improved contrail factor even if the electrical drive is used to input enough power to the fan to maintain the desired operating thrust. By increasing the electrical drive for the fan to push even more air through the bypass duct than required for the operating propulsion the dilution effect can be enhanced and hence the contrail factor can be further reduced. The thrust produced by the other propulsive fans (if present) may be adjusted by the system controller 28 to maintain the commanded or desired total thrust required by the aircraft.

Conversely, in circumstances where the available power of the motor 113 is insufficient to maintain the desired level of thrust from the engine's co-located fan 102 during a contrail-suppression condition in which the core fuel-flow rate has been reduced, the thrust from the other propulsive fans 12 may temporarily be increased to compensate for a reduced level of thrust from the co-located fan 102 during the contrail-suppression condition.

Figure 6:
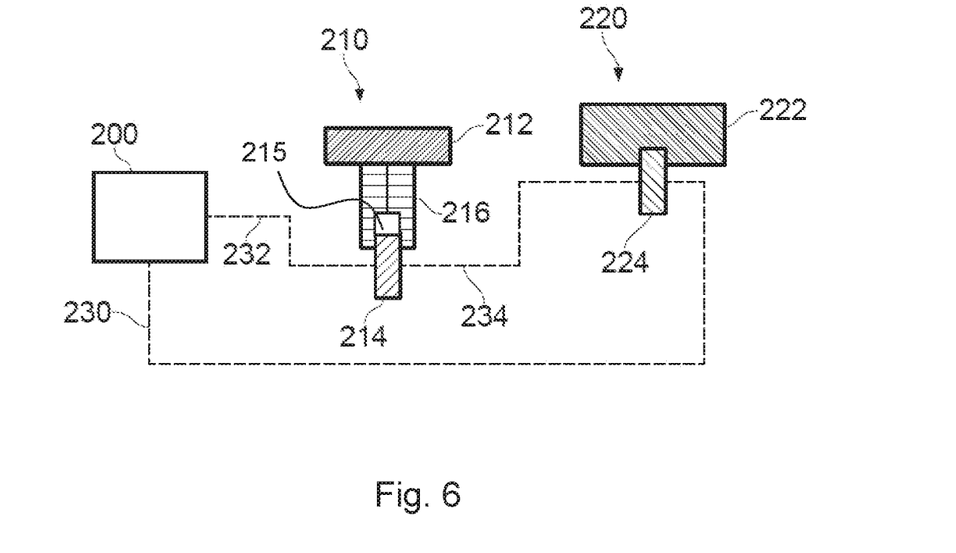
FIG. 6 depicts components of a distributed propulsion system according to one example of the invention.

FIG. 6 depicts a simplified image of the propulsion system that has an energy storage unit 200 which may be a battery or other form of energy storage deemed suitable such as, for example, flywheel, capacitor-array, compressed air, liquid air energy store. An engine 210 comprises a coaxial fan 212, an engine core 216 and an electrical machine (i.e. a motor/generator) 214 configured selectively to drive or be driven by the fan 212 and/or the engine core 216. The electrical machine 214 is drivingly connected to the fan and/or engine core via one or more shafts.

The engine 210 and its associated engine core 216 may be either of the engines 110 shown in FIGS. 2 and 3. The electrical machine 214 may thus be the motor/generator 113 shown in those figures.

The engine core 216 mechanically drives the fan 212 and/or electrical machine 214 when used as a generator.

A remote propulsive fan 220 comprises a fan 222 and an electrical machine (i.e. a motor/generator) 224 that is either integral with or drivingly connected, e.g. via a shaft, to the fan and configured to drive or be driven by the fan according to a prevailing mode of operation. In practice, there may be more than one remote propulsive fan. In some embodiments, there could be many small remote propulsive fans (each with its own motor/generator) configured to ingest and re-energise the boundary layer air flowing over or under the aircraft's wings or other surfaces such as the fuselage.

A first electrical cable 230 is configured to transport electrical energy (in either direction, according to the prevailing mode of operation) between the energy storage unit 200 and the motor/generator 224. A second electrical cable 232 is configured to transport electrical energy (in either direction, according the prevailing mode of operation) between the motor/generator 214 and the energy storage unit 200.

A third electrical cable 234 is configured to transport electrical energy between the motor/generator 214 and the motor/generator 224. The direction of energy flow would, in all envisaged modes of operation, be from 214 to 224. However, flow in the opposite direction should not be ruled out.

There would also be a control and decision/making unit (not shown) which would be in signal communication with the energy storage unit 200, the engine core 216, the motor/generator 214 and the motor/generator 224. The control and decision making unit could be an integral part of, or a module within, an engine-control-unit (ECU) of the engine 210, to be described below, or it may be a separate physical entity in signal communication with the ECU. If required, the control and decision making unit may also be in signal communication with the co-located fan 212, and the fan 222 (if present), for the purposes of instructing changes to their respective blade pitches. Furthermore, the control-and-decision-making unit could also be in signal communication with any variable-area nozzles which may be present, in order to determine and instruct changes thereto.

In FIG. 6, a gearbox 215 unit is provided to change the rotational speed ratio of the fan and/or the HP shaft/compressor of the engine core relative to the rotor of the electrical machine 214. The gearbox unit 215 may comprise a selector or clutch arrangement for selective coupling to either or both of the fan rotor/shaft and engine core compressor. When used with an electric motor to drive both the fan 212 and engine core 216 shafts, the gearbox may have one or more predetermined gear ratio for driving both shafts at fixed relative rotational speeds. Typically a plurality of gear ratios will be provided such that a suitable gear ratio can be selected by the control unit that most closely matches the desired relative rotational speeds for the engine core compressor and the booster or IPC rotor, depending on the specific engine configuration.

Figure 7:
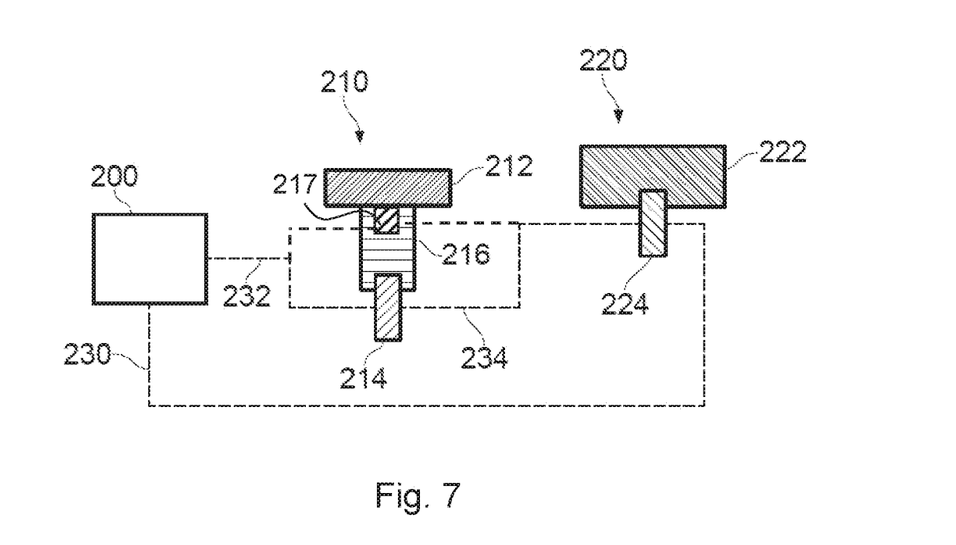
FIG. 7 depicts components of a distributed propulsion system according to another example of the invention.

In FIG. 7, the single electrical machine configuration for the engine 210 has been replaced with a dual-electrical-machine configuration. Thus a first electrical machine 214 is provided for the engine core 216 and a second electrical machine 217 is provided for the fan 212. In this configuration, each electrical machine 214, 217 may have its own respective gearbox. This may reduce the complexity of any gearbox required and may allow each electrical machine to be controlled with a greater degree of freedom from the operational requirements of the other. Thus the speed of each electrical machine when operating as either a generator or motor can be tailored to an optimal speed for the shaft to which it is connected under the given operational conditions instead of being limited to a number of fixed relative gear ratios. For example, when providing electrical assistance to both the fan 212 and engine core 216, it may be desirable to have greater freedom over the rotational speed of the fan 212 compared to that of the engine core 216.

In the configuration of FIG. 7, the motor generator 113 of FIGS. 2 and 3 would be coupled to only one of shafts 111 and would thus correspond to one of electrical machines 214 and 217, with the other electrical machine being coupled to the other shaft 111.

For different operational states/requirements of the engine, or different flight regimes, the propulsion system may be controlled in a different manner. For example, when the thrust demand for the propulsion system is relatively high, the engine 210 will typically be running with high power output and powering its own coaxial fan 212. If additional thrust is required, i.e. beyond the output of the engine core, the energy storage unit could supplement the power to the fan by driving the electrical machine(s) 214/217 as motors. Additionally or alternatively, the energy storage unit could provide supplementary power to the remote propulsive fan 220 (if present). If additional thrust is not required, the engine core could itself drive either or both of the electrical machines 214/217 as generators.

Such a high thrust demand could apply during take-off and climb (including in particular step-climb and top-of-climb as well as the climb away from a departure airport), or during certain aircraft manoeuvres, e.g. such as emergency manoeuvres.

In contrast, when the thrust demand is very low, engine 210 may be run at an idle speed or may be shut down for a period of time, e.g. for a cruise phase of a short flight. Thrust could be provided predominantly or entirely using electrical energy from the energy storage unit 200 to drive the co-located fan 212 within the engine 210, and optionally the remote propulsive fan 220.

During cruise, the energy storage unit could also be receiving electrical energy from the generator 214/217 of the engine 210, and thus be charged. The engine throttle is set at a suitable level to meet the aircraft's thrust requirement as well as providing charge to the energy storage unit 200.

In the descent phase of flight, the engine 210 is in its unlit or idle state. The fan 222 of the propulsive fan 220 (if present) is being driven ("windmilling") by air-flow resulting from the forward motion of the aircraft, and as a result is causing the generator 224 to generate electrical energy which is used to charge the energy storage unit 200. Additionally or alternatively, the co-located fan 212 of the engine 210 can be used in a "wind-milling" capacity to charge the energy storage unit 200 with electrical energy generated by the generator 214/217. This would advantageously allow aircraft speed to be regulated in support of steeper descents without the need to configure the aerofoils of the aircraft wing into a high-drag high-noise configuration. Alternatively the airflow to the co-located fan 212 could be closed off (as shown in FIG. 5) to reduce drag.

Regardless of the normal operation modes of the propulsion system, a contrail-suppression mode is also available. This mode is selected when a) contrail formation is observed and/or predicted according to observed ambient conditions and the engine's operating condition prior to selection of this mode, and optionally b) ambient conditions are conducive to contrail persistence. Further criteria could be employed in deciding whether or not to suppress the formation of a contrail.

Whilst the term 'contrail suppression' is used herein, it is intended that partial or complete suppression of a contrail is contemplated by the invention. If complete suppression of contrail formation is not achieved during an instance of use, the invention may nonetheless allow a reduction in the optical depth of the formed contrail, e.g. due to activation of a smaller proportion of the potential condensation nuclei in the engine exhaust. Even where complete suppression of a contrail is achievable, it may be undesirable due to other control considerations and so control settings that enable partial contrail suppression may be enacted.

During contrail suppression the fuel-flow rate to the engine core 216 is reduced and may for example be reduced down to zero (or very close to zero corresponding to an idle setting). In this mode of operation, the aircraft may fly exclusively on stored electrical energy drawn from the energy storage unit 200, for the duration of the contrail suppression requirement. Thus the contrail suppression mode may resemble an all-electric cruise mode as described above. This mode is selected if a more modest reduction in engine fuel flow rate is insufficient to suppress contrail formation, or if electric-only cruise is deemed advantageous for other (i.e. non-contrail-related) reasons.

When the fuel flow rate is non-zero, i.e. when the engine is operational but generating significantly less thrust than would be required to propel the aircraft without electrical assistance, the potential range of relative rotation speeds between the engine core shafts 111 (in FIG. 2) is large. That is to say, the fan 102/212 could be driven at varying rotational speeds to provide thrust, whilst the engine core compressor and turbine are run at lower than normal speeds.

This ability to significantly alter the relative rotation speeds between the engine shafts allows greater freedom of control but places the engine core in a flow regime that is outside the scope of a conventional, i.e. electrically-unassisted, engine. The available range of control could thus force the booster/IPC into one or more unwanted operational regimes, such as an engine/compressor stall or surge condition. This is because the reduction in engine core speed causes a reduction in ingested mass flow at the engine core compressor and thus a reduction in mass flow for the booster/IPC. However because the booster/IPC is associated with the fan it can be driven at variable speed according to a desired thrust level to be supplied by the fan, rather than its own requirements.

It has been determined that a full range of propulsion system operation, e.g. for reasons of contrail suppression and/or engine efficiency, may be permitted by selectively assisting the engine core 216 via the motor 214 when required to maintain safe engine operation. For example, in periods when the engine core speed is reduced and the fan 212 is driven whether solely or partly by its electric motor, the engine core compressor could also be selectively driven by the electric energy store 200 via motor 214 when the IPC or booster is facing an elevated risk of stall/surge.

Returning to FIG. 2, the turbofan gas turbine engine 110 has a plurality of engine operation sensors shown schematically at 124 and 126. The sensor examples 124 and 126 may be arranged to measure pressure at the intake 105 (i.e. upstream of the fan 102) and also the total pressure in the bypass duct 107, thereby allowing determination of the power produced by the engine 110. However this provides just one example of an engine operation sensor arrangement and there are many additional or alternative engine sensor arrangements that may be used in conjunction with the invention as will be described below.

A controller 120 is also arranged to receive signals of sensed parameters from externally of the engine 110, such as from one or more ambient condition sensor 128 and/or a contrail detection sensor 130. The ambient sensor 128 comprises a plurality of sensors for measuring altitude (e.g. ambient pressure), temperature and/or humidity. The contrail detection sensor in this example comprises an optical depth sensor having a field of view downstream of the engine exhaust (i.e. to detect formation of contrails aft of the engine). Alternative contrail detection sensors could be used, such as an acoustic transmitter/receiver. Any of the external sensors 128, 130 may be mounted on the aircraft body or wing.

The controller 120 is arranged to receive signals of sensed parameters in use from the engine operation and other sensors. The sensors 124-130 supply signals/measurements to the controller 120 via connecting leads (e.g. electrical or fibre-optic cable) or else a local wireless network.

The controller 120 is typically a general engine or propulsion system controller, i.e. arranged to control numerous aspects of engine/system operation in addition to the contrail mitigation system described herein. Accordingly, it will be appreciated that such a controller will typically receive inputs from a significant number of other sensors. However, one or more bespoke control algorithm (e.g. one or more module of code) will control operation of the controller as a contrail mitigation controller in accordance with the invention. Such functionality dictates which engine operation variables are available for control in accordance with the contrail mitigation strategy. The controller will also determine what scope of control is available for the purpose of contrail mitigation based upon other engine operation requirements such as engine-throttle-setting and/or thrust-requirement setting that must be prioritized above contrail mitigation needs.

Ambient condition sensors 128 are as described above and are arranged to output real-time or near-real-time information concerning the ambient pressure, ambient temperature and/or ambient humidity of air through which the aircraft is flying. In another example, one or more of those sensors 128 may optionally be replaced and/or supplemented by a database of forecast data (e.g. obtained prior to the flight and/or updated periodically during the flight via radio-link or similar) which details the ambient condition(s) that the flight will encounter along its proposed flight routing and altitude profile, taking account of the expected time at which each point of the proposed route will be passed.

A deployment policy or contrail suppression policy may be employed. The policy allows prioritisation of the control system to achieve greatest beneficial climate impact. That is to say the policy determines how best the invention should be employed to ensure that, within the confines of safe engine operation, any increased fuel burn due to reduction of overall propulsion system efficiency is outweighed by the beneficial impact of contrail suppression/mitigation. The policy can be implemented by one or more routine or calculation to assess whether or not to attempt contrail suppression according to either or both of:

An assessment of the likely climate warming impact if the contrail is allowed to form An assessment of any cost penalty associated with allowing the contrail to form The assessment of climate warming impact would primarily take into account one or more of the following factors:

Will the contrail persist?

Over the contrail's lifetime/persistence, what is the balance between day-time and night-time?

What is the temperature of the ambient air in which the contrail will reside?

Using answers to the above questions, a decision on whether or not to deploy the contrail mitigation/suppression mode can be taken, e.g. according to one or more contrail characteristic, such as whether or not a predetermined threshold of climate-warming impact of the contrail is met or exceeded.

In a decision-making process for determining whether control steps are required to mitigate against contrail formation or else promote operating efficiency, the control system operates a primary loop to check whether the operating conditions (i.e. the ambient conditions and/or engine operation parameters) have changed materially since a previous iteration. The operating conditions could comprise any, or any combination of, ambient temperature, ambient pressure, ambient humidity, altitude, and/or engine throttle setting or engine operating point. Any material change may comprise change of any one or more parameter to an extent that will materially alter a contrail characteristic (or persistence, or occurrence of contrails). This primary loop can be iterated without changing existing settings until a relevant change to operating conditions is determined. Current operating conditions could be stored at each iteration such that the next iteration can compare current operating conditions against one or more recorded set of previous operating conditions. Alternatively, current operating conditions are stored during the first iteration of the primary loop and thereafter only when a material change to the operating conditions is detected relative to the previously stored value. In any example, a log of previous operating conditions is maintained to allow comparison with current or most recently sensed conditions.

The controller then determines, e.g. according to a current usage/deployment policy, whether it is deemed appropriate to use a method for mitigating contrail formation under the current operating conditions. For instance, it may or may not be considered appropriate to only use this invention when contrails persist, e.g. if ambient relative humidity over ice is 100% or greater.

When operating at reduced engine core speeds and/or modified fan speeds, the controller determines whether the intended engine core operating conditions induce an adverse operating state for the engine. The surge margin may be taken into consideration when determining an adverse operating state, although the invention need not be limited only to surge risk monitoring. Various options of individual thresholds for indicating adverse operating states for the engine core could be selected, such as pressure change across the compressor, flow rate, shaft rotation speed, torque, combustion temperature, fuel flow rate or any combination of those parameters.

It will be appreciated that the dynamic nature of the system will require thresholds for deciding when selective electrical motor assistance to the engine core compressor is required to be set based on relative values for a plurality of parameters. For example a combination of pressure drop and flow rate may be used. Either or both of those parameters may be used in conjunction with the torque applied to either or both engine shafts 111.

The relevant threshold(s) will be selected with safety margins applied based on known operational characteristics of the relevant compressor, e.g. the compressor map.

The safety margin may also account for any current rate of deceleration of the compressor and/or the normal time required to enact a desired speed change for the compressor and the associated mass flow rate through the compressor. Thus the controller may operate according to a predictive algorithm to avoid onset of potential surge conditions rather than actual measured surge onset.

If an intended adverse operating condition is determined, the controller determines the degree of electrical assistance to the engine core compressor that is required to avoid the onset of the adverse condition. The controller also determines whether sufficient electrical energy is available to avoid onset of the adverse condition, either in a transient manner or else in an ongoing/prolonged manner. In this way, prior to instructing a change in engine operation, the controller can determine whether the change can be made without compromising a safety condition or margin for the required duration.

If the relevant adverse condition mitigation requirements can be met, the controller can instruct the change in operating conditions, along with any electrical assistance to the engine core (i.e. high pressure) spool as required.

An assessment of whether or not a particular contrail characteristic would warrant mitigation steps is undertaken by checking whether one or more ambient sensor reading and/or engine operation parameter achieve a threshold level. In one example, a vapour trail detection sensor 130 may be used to trigger contrail mitigation action and/or to verify a determination of the presence or absence of a contrail. If there has been no material change in the operating conditions, or a material change in the operating conditions is detected but any of the other conditions described above are not satisfied, then no change to the current contrail mitigation control settings are made.

In various examples of the present invention, it is considered pertinent to optionally disable the contrail suppression system during one or more flight phase, such as during take-off, climb and/or approach, where emergency situations may demand that more thrust is commanded quickly. The control system may operate according to different operational priorities during these conditions so that the electrical devices are ready to provide additional power promptly if and when it is requested by the pilot (e.g. in case of emergencies etc.).

The present invention may focus particularly on the avoidance of contrail formation in regions of ice-supersaturated (ISS) air. However, on average, aircraft spend only a small proportion of their flight-time in ISS air, and so the proportion of the flight during which a contrail suppression mechanism needs to be active in order to mitigate against a majority of the negative climate impact of contrail formation is relatively small. Thus, instead of attempting to suppress all contrails to some level, the invention focuses on the careful identification of specific periods only in which suppression of contrail formation or advantageous modification of contrail properties can bring about a net positive climate impact beyond what would be achieved using conventional engine control.

Whilst the embodiment described above refers primarily to an arrangement in which an engine comprising a core and a fan forms part of a distributed propulsion system comprising remote propulsive fans, it will be appreciated that the contrail-suppression method comprising a reduction in the core fuel-flow rate of an engine in conjunction with electrical-supplementation of the power supplied to the fan of the same engine could also be applied to a gas turbine, including a high-bypass-ratio gas turbine, irrespective of the existence of remote propulsive fans.

It will also be appreciated that a related approach to contrail suppression, effective particularly at low throttle conditions or idle conditions such as during descent or during loitering, involves a temporary reduction in electrical power offtake from the engine, meeting some or all of the aircraft's electrical power requirements (such as avionics, aileron and elevator control, air-conditioning etc.) from stored energy rather than from the engine power offtake. This is because the engine power offtake slightly reduces the exhaust temperature, but without altering the water vapour emission rate. A reduction in power offtake from the engine thus reduces the engine's contrail factor, in other words the gradient of the mixing line, and hence reduces susceptibility to contrail formation. The materiality of this effect is greater when the magnitude of the power offtake is a significant fraction of the rate of fuel-energy released during combustion, in other words at low throttle settings.

Optionally, mixing between the core exhaust and the bypass exhaust of the engine could be enhanced by a lobed mixer, which might have the additional benefit of slightly increasing propulsive efficiency.

Whilst the invention is described particularly in the context of contrail suppression, it will be appreciated that the invention may equally apply to propulsion system in which fuel/energy efficiency is prioritised over, or instead of, contrail formation.

Accordingly, the range of control permitted by use of the electrical machines selectively to drive either or both of the high pressure and low pressure compressors as described herein may be useful even when contrail suppression is not required, for example to avoid adverse operating states, for example during engine deceleration.

The invention claimed is:

1. An aircraft propulsion system comprising:
    an engine comprising a propulsive fan and an engine core, the engine core comprising a compressor, a combustor and a turbine driven by a flow of combustion products of the combustor, the propulsive fan configured to generate a mass flow of air that bypasses the engine core and propels an aircraft on which the engine is located;
    an electrical energy storage unit on board the aircraft, the propulsive fan and engine core compressor being coupled to separate shafts and being coaxial;
    a first electric motor arranged to drive the engine core compressor;
    a second electric motor arranged to drive the propulsive fan; and
    a controller configured to control the first and second electric motors by altering a ratio of the mass flow of air by the propulsive fan to the flow of combustion products of the combustor,
    wherein control of the first and second electric motors comprises selectively driving both the propulsive fan and engine core compressor by the electrical energy storage unit via the first and second electric motors.

2. The aircraft propulsion system according to claim 1, wherein the first electric motor is configured to selectively assist the engine core compressor by supplementing torque applied to the compressor via the turbine due to the engine core combustion process.

3. The aircraft propulsion system according to claim 1, wherein the controller is configured to reduce the flow of combustion products produced by the engine core and the controller is further configured to concurrently increase power supplied to the propulsive fan by the second electric motor in order to meet a thrust demand for the aircraft.

4. The aircraft propulsion system according to claim 1, wherein the engine comprises a further compressor and the controller controls operation of the first electric motor to drive the engine core compressor at a rotational speed to achieve at least a threshold value of an operational variable for the further compressor.

5. The aircraft propulsion system according to claim 4, wherein the operational variable comprises an absolute or relative operational variable between the engine core compressor and the propulsive fan or further compressor.

6. The aircraft propulsion system according to claim 4, wherein the controller controls operation of the first electric motor so as to prevent operation of the further compressor from crossing a predetermined threshold value for a compressor surge margin.

7. The aircraft propulsion system according to claim 4, wherein the further compressor comprises a booster or intermediate pressure compressor arranged to be driven with the propulsive fan by the second electric motor.

8. The aircraft propulsion system according to claim 1, wherein the first and second electric motors are controlled according to a control hierarchy wherein priority is given to driving the propulsive fan for contrail mitigation and the engine core compressor is selectively driven by the first electric motor so as to maintain a safe engine operating profile.

9. The aircraft propulsion system according to claim 1, wherein the first electric motor is configured to drive both the propulsive fan and the engine core compressor via a selective transmission system.

10. The aircraft propulsion system according to claim 1, wherein the first electric motor is configured to drive the engine core compressor when the propulsive fan is concurrently driven by the second electric motor.

11. The aircraft propulsion system according to claim 1, wherein the propulsive fan comprises a booster.

12. The aircraft propulsion system according to claim 1, wherein the propulsive fan is driven by an intermediate pressure shaft of the engine, and a gearing is provided for altering a rotational speed of the propulsive fan relative to a speed of the intermediate pressure shaft.

13. The aircraft propulsion system according to claim 1, wherein a gearbox is provided in a force path between the first electric motor and the propulsive fan and/or the compressor of the engine core.

14. A method of operating an aircraft propulsion system comprising an engine including a propulsive fan and an engine core, the engine core comprising a compressor, a combustor and a turbine, the propulsive fan configured to generate a mass flow of air that bypasses the engine core and propels an aircraft on which the engine is located; and an electrical energy storage unit on board the aircraft, the propulsive fan and the engine core compressor being coupled to separate shafts and being coaxial, wherein a first electric motor is arranged to drive the engine core, and a second electric motor is arranged to drive the propulsive fan, the method comprising:
    supplying fuel to the combustor to produce a flow of combustion products for driving the turbine and the compressor;
    selectively altering a ratio of the mass flow of air by the propulsive fan to the flow of combustion products of the combustor; and
    selectively assisting rotation of both the compressor and the propulsive fan by the electrical energy storage unit during the altering of said ratio.

15. The aircraft propulsion system according to claim 5, wherein the operational variable comprises rotational speed, torque, flow rate, and/or pressure drop.

* * * * *